United States Patent

Fröhlich

[11] Patent Number: 6,086,300
[45] Date of Patent: Jul. 11, 2000

[54] CLAMPING SCREW

[75] Inventor: Klaus Fröhlich, Pforzeim, Germany

[73] Assignee: Halfen GmbH & Co., Germany

[21] Appl. No.: 09/341,859

[22] PCT Filed: Jan. 7, 1998

[86] PCT No.: PCT/EP98/00047

§ 371 Date: Jul. 16, 1999

§ 102(e) Date: Jul. 16, 1999

[87] PCT Pub. No.: WO98/31943

PCT Pub. Date: Jul. 23, 1998

[30] Foreign Application Priority Data

Jan. 16, 1997 [DE] Germany .................. 297 00 737 U

[51] Int. Cl.$^7$ .............. F16B 27/00; F16B 39/00
[52] U.S. Cl. ................ 411/84; 411/107; 411/553
[58] Field of Search .............. 411/84, 85, 104, 411/107, 400, 409, 551, 553

[56] References Cited

U.S. PATENT DOCUMENTS

| 2,676,680 | 4/1954 | Kindorf . | |
|---|---|---|---|
| 3,345,899 | 10/1967 | Fiddler | 411/85 X |
| 4,460,299 | 7/1984 | Kowalski | 411/85 |
| 4,830,531 | 5/1989 | Condit et al. | 411/85 X |
| 5,076,748 | 12/1991 | Waterfield et al. | 411/551 |

FOREIGN PATENT DOCUMENTS

| 2 062 421 | 6/1971 | France . | |
| 2 452 023 | 10/1980 | France . | |
| 2 587 067 | 3/1987 | France . | |
| 2636687 | 3/1990 | France | 411/85 |
| 2 123 511 | 2/1984 | United Kingdom . | |

Primary Examiner—Neill Wilson
Attorney, Agent, or Firm—Robert W. Becker & Associates

[57] ABSTRACT

A clamping screw (1) comprises a screw shaft (3) with a thread and a hammer-shaped screw head (2) which can be inserted in a positive-locking manner into a T groove (4) of a construction component (25). In the mounted position, the screw head (2) extends transverse to a longitudinal slot (5) of the T groove (4) and engages with clamping portions (7) support legs (6) extending on either side of the longitudinal a slot (5). The clamping portions comprise respectively a leading edge (12) and a blocking edge (13) resting at one of the groove walls (14). The blocking edge (13) projects from a lateral surface which is part of the longitudinal side (11) and a connecting line (15) between the leading edge (12) and the blocking edge (13) of the same longitudinal side (11) intercepts a transverse axis (10) of the screw head (2) at an angle which deviates from 90°.

16 Claims, 4 Drawing Sheets

Fig. 4b
PRIOR ART
Fig. 5b
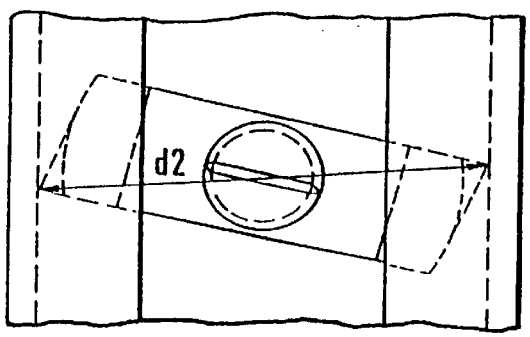
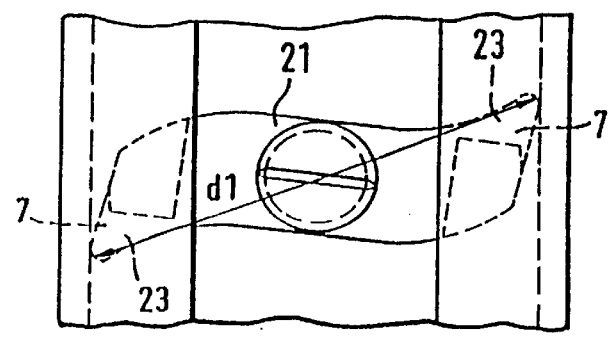
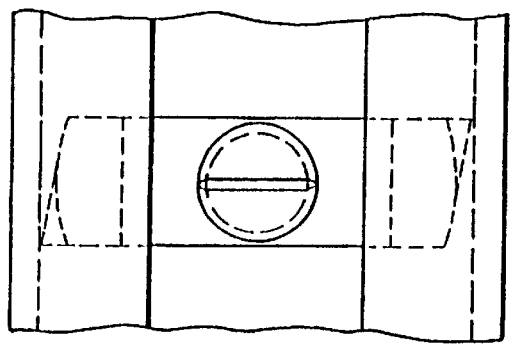
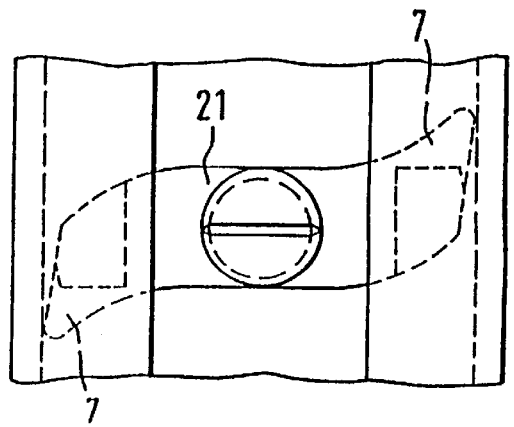
Fig. 4a
PRIOR ART
Fig. 5a

CLAMPING SCREW

BACKGROUND OF THE INVENTION

The invention relates to a clamping screw.

Such clamping screws, which are loaded by pulling forces and transverse loads, are used in mounting rails, for example, in anchoring rails in construction technology. They have a screw shaft with a thread and a screw head that is hammer-shaped and received in a positive-locking manner in a T groove of the construction component, for example, a mounting rail having a C profile. The screw head can be inserted into the T groove through a longitudinal slot and is brought into the mounting position by rotation about approximately 90°. In the mounding position the screw head with clamping portions engages under support legs of the T groove positioned at both sides of the longitudinal slot. By tightening a nut onto the screw shaft, the clamping screw is then secured at any desired location in the longitudinal direction of the T groove. The clamping portions are positioned at both free ends of the screw head. Between them, a socket, having a greater height and supporting the shaft, may be provided, which has alignment surfaces which are positioned parallel to a transverse axis of the screw head extending centrally through the screw shaft.

The clamping portions of the screw head in this clamping screw have leading edges and following blocking edges in the rotational direction of tightening. The blocking edges have a greater diametric distance then the leading edges so that for preventing a further rotation of the screw head past the mounting position they can be supported at the groove wall of the T groove. The blocking edges provide an abutment for the tightening moment upon placement of the nut and secure the screw head in the mounting position within the T groove transverse to the longitudinal slot.

The mounting position of the clamping screw for a preset dimensioning of the T groove depends on the geometry of the screw head. The clamping screw, and also the mounting rail, can be produced, because of manufacturing-technological reasons, only with tolerances with regard to the final dimensions. In known clamping screws, the fitting tolerances result in an unsatisfactory alignment of the clamping screw within the mounting rail. When a clamping screw with maximum tolerances of the screw head is clamped at a narrow location of the T groove having smallest tolerances, then the screw head is secured prematurely by abutment of the blocking edges and cannot be brought into the ideal mounting position. In the most unfavorable situation of tolerances, the screw head is positioned at a slant within the T groove so that it does not have the predetermined rotational position relative to the mounting rail and the clamping portions of the screw head are only clamped in an unsatisfactory manner at the legs of the mounting rail. When the dimensions of the screw head are within the lower tolerance range and those of the mounting rail are within the upper tolerance range, it is possible, when tightening that the screw, head is turned too far within the T groove, i.e., past the mounting position.

It is an object of the invention to embody the clamping screw of the aforementioned kind such that it is inserted substantially position-exact and with sufficient clamping force into the construction component, e.g., a mounting rail.

SUMMARY OF THE INVENTION

The screw head of the clamping screw is thus inventively designed such that the blocking edge projects from a plane of a lateral surface positioned perpendicularly to a transverse axis of the screw head, whereby the lateral surface is a portion of a longitudinal side. Within the screw head contour, at each one of the longitudinal sides, a connecting line between the leading and blocking edges will intercept the transverse axis of the screw head at an angle that is different from 90°. The screw head thus is provided with a considerably greater diameter between the blocking edges then is known from known clamping screws so that within the entire fitting tolerance range between the screw head and the T groove only a minimal and neglectable deviation from the preset rotational position of the clamping screw in its end position will result. Furthermore, the screw head is reliably clamped against the support leg within the T grooves independent of the respective fitting tolerance at the mounting location of the clamping screw and is thus secured in its position. When the screw head has radial symmetry relative to a screw axis extending through the screw shaft, the positioning of the clamping screw in the ideal mounting position is especially simple.

BRIEF DESCRIPTION OF THE DRAWINGS

Embodiments of the invention are explained in the following with the aid of the drawing. It is shown in:

FIGS. 4a and 4b schematically each show different positions of a clamping screw of a conventional design in a mounting rail;

FIGS. 5a and 5b show respective positions of the inventive screw in comparison to the positions of the clamping according to 4a and 4b.

DESCRIPTION OF PREFERRED EMBODIMENTS

Figure 1:
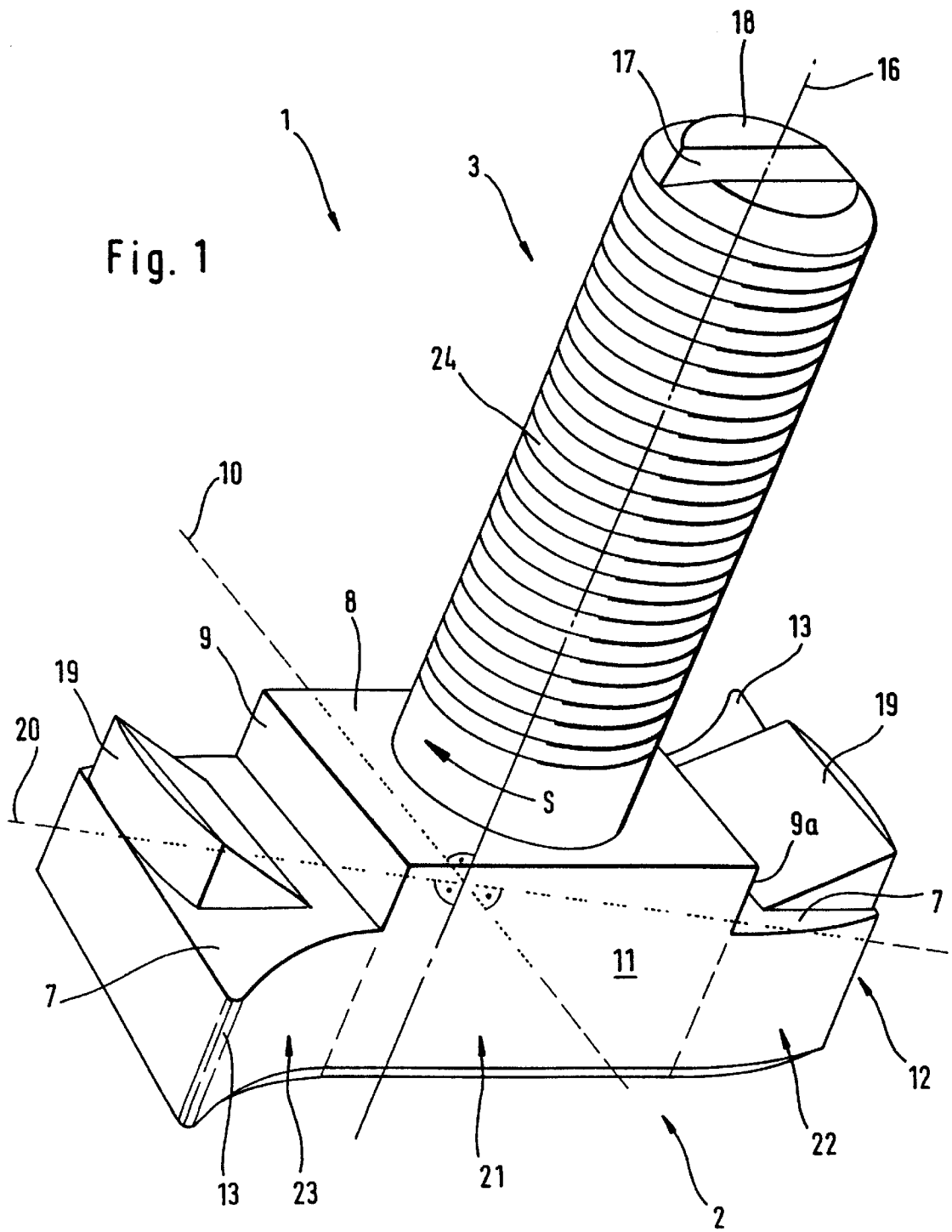
FIG. 1 a clamping screw in a perspective representation.
Figure 2:
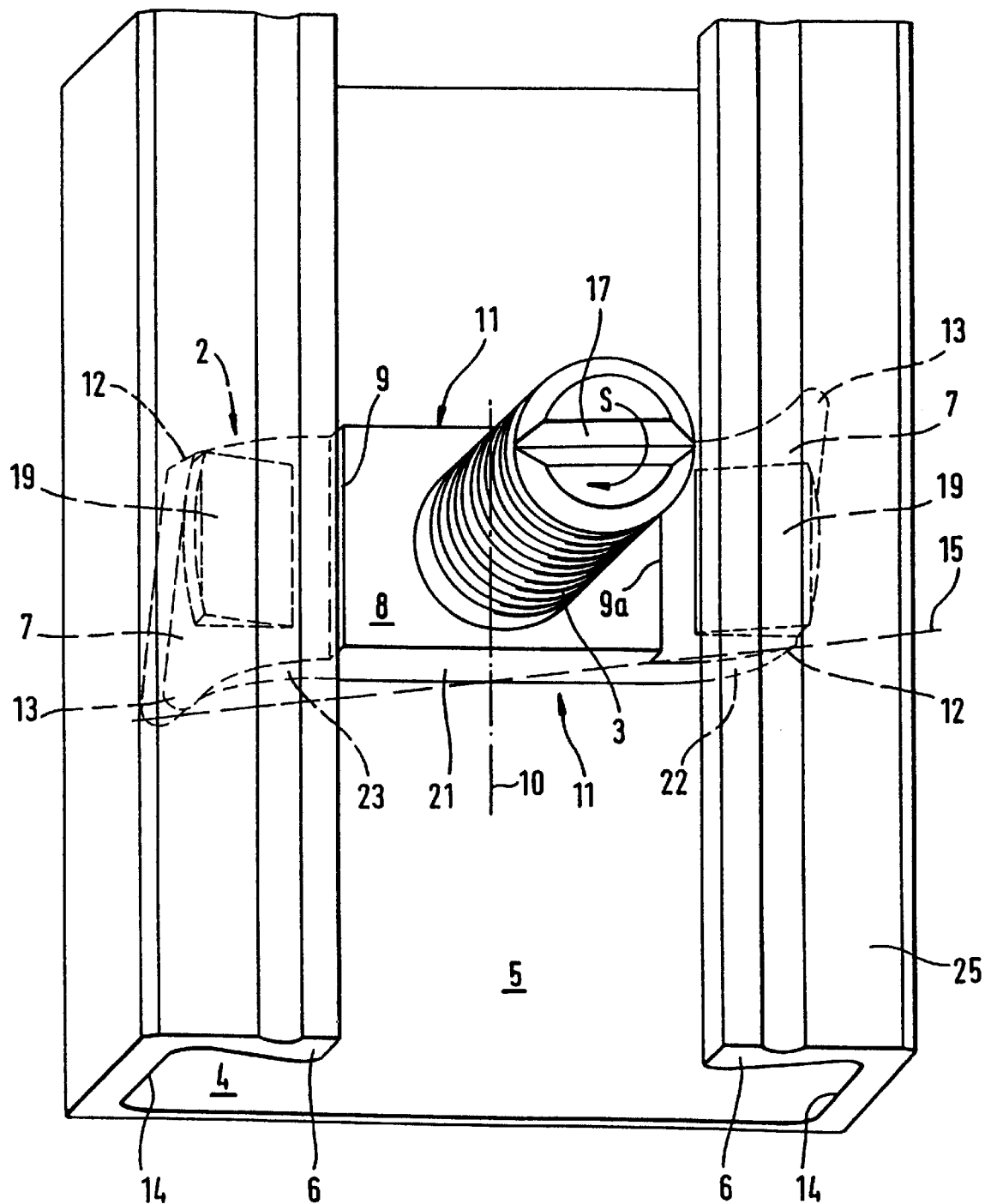
FIG. 2 the mounting position of the clamping screw in a mounting rail having a C profile interprespective representation.

The clamping screw 1 shown in FIG. 1, a shown in FIG. 2, is to be inserted into a mounting rail 25 having a C profile. Such mounting rails are, for example, embedded in concrete in a wall or a ceiling of a building and are anchored therein for which purpose anchors are fastened within the rail back (not represented). The clamping screws inserted into such an anchoring rail are designed for fastening construction components, which are to be fastened to the wall or the ceiling. The screw 1 is comprised of a hammer-shaped screw head 2 and a screw shaft 3 with thread 24 onto which a non-represented screw nut with washer is to be placed which projects past the longitudinal slot 5 of the rail. The screw shaft 3 is supported by a socket 8 which is a component of a middle portion 21 and projects with end surfaces 9 and 9a past the screw head 2. Clamping portions 7 of the screw head 2 are connected to the middle section 21. The end faces 9 and 9a of the socket 8 are positioned parallel to a transverse axis 10 of the screw 2 (FIG. 3) and, in the optimal mounting position of the clamping screw 1 (FIG. 3a), extend parallel to the longitudinal axis of a T groove 4 of the mounting rail 25. In the mounting position, the screw head 2 is positioned transverse to the longitudinal slot 5 of the mounting rail 25 and engages with the clamping portions 7 respectively the support legs 6 of the rail positioned to both sides of the longitudinal slot 5. Each clamping portion 7 supports a clamping wedge 19 with an upper surface which declines toward the socket 8 and provide the screw head 2 with a hook action for an improved attachment in the correspondingly shaped T groove 4, thus providing favorable clamping conditions after placement of the nut onto the screw shaft. The clamping wedges 19 are positioned opposite to on another on a longitudinal axis 20 of the screw head. The longitudinal axis 20 extends perpendicularly to the transverse axis 10 and to the axis 16 of the screw shaft 3. At the shaft end 18 of the threaded shaft 3, a rotational angle marking is provided in the form of a marking notch 17 which indicates the longitudinal extension of the screw head 2 and is parallel to the longitudinal axis 20.

The screw head 2 is embodied with radial symmetry to the screw axis 16 such that the clamping portions 7 on both sides of the central portion 21 are positioned at a slant to its longitudinal extension. They each have in the rotational direction S of the clamping screw 1 a leading edge 12 and a following blocking edge 13. The rotational direction S corresponds to the thread orientation of the thread 24. The central portion 21 is positioned perpendicularly to the transverse axis 10. Adjacent to the clamping portions 7, the longitudinal sides 11 of the screw head 2 each have a leading portion 22 convexly curved relative to the leading edge 12 and a following portion 23 concavely curved relative to the blocking edge 13. As an alternative to the represented concave curvature, the longitudinal side 11 can also be embodied of two or more planes or portions angularly positioned to one another. The wave-shaped contour of the screw head 12 having a connecting line 15 between the leading edge 12 and the opposite following blocking edge 13 on the same longitudinal side 11 (FIGS. 3a–3c) which is not positioned at a right angle to the transverse axis 10 the length of the diagonal d1 of the screw head 2 between the blocking edges 13 is thus greater than the length of the diagonal d2 for a substantially rectangular contour of the screw head, as can be seen when comparing FIG. 4 and FIG. 5. With a minimal cross-section of the screw head 2, and thus a minimal weight of the clamping screw 1, a reliable securing action of the screw head 2 in the mounting position is thus provided.

FIG. 2 shows the mounting position of the clamping screw in the mounting rail 25 having a C profile. This profile shape with a longitudinal slot 5 in the mounting rail provides the continuous T groove 4 with the support legs 6 of the rail 25 on both sides of the longitudinal slot 5. The screw head 2 of the clamping screw can be inserted through the longitudinal slot 5 at any desired location into the T groove 4 and is rotated in the tightening rotational direction S by approximately 90° into the mounting position, in which the screw head with its terminal clamping portions 7 engages the support legs 6 and rests with its blocking edges 13 at the groove walls 14. The clamping wedges 19 can be positioned at the correspondingly slanted support legs 6 of the mounting rail 25. The clamping screw can thus also be called a hook head screw. When tightening the nut placed onto the screw, pressing apart of the legs 6 at the longitudinal slot 5 is reliably prevented, due to the shape of the screw head. The marking notch of the screw shaft 3 is positioned in its optimal mounting position (FIG. 3a) perpendicularly to the longitudinal axis 26 of the mounting rail 25 and is thus positioned transverse between the support legs 6. The marking notch 17, even after placement of the nut onto the shaft of the clamping screw, is still visible so that at any time the mounting position of the screw head 2 in the T groove 4 can be checked.

The socket 8 of the screw head 2 protrudes with its end faces 9 and 9a, extending parallel to the transverse axis 10, between the support legs 6 of the mounting rail 25 and is dimensioned such that, upon contact of end face 9 at the one support leg 6, the other end face 9a has a spacing from its neighboring support leg 6. Upon insertion of the clamping screw into the mounting rail 25, the end face 9 can rest at one support leg 6 and thus serves as an alignment surface (FIG. 3a.). The spacing of the end face 9a and the other support leg 6 is required in order to allow a slight slanted position of the screw head resulting from manufacturing tolerances (compare FIGS. 3b and 3c).

The blocking edges 13, following in the rotation direction S, have a greater spacing from one another then the two leading edges 12 and thus secure the screw head by supporting action at the groove wall 14 of the mounting rail 15 in the mounting position transverse to the rail extension. The leading edges 12 and following edges 13 are rounded. The radius of the blocking edges 13 provides, upon securing of the clamping screw in the rail, a uniform distribution of the stress resulting from pressing of the blocking edges 13 onto the groove walls 14.

A connecting line 15 between the blocking edge 13 and the leading edge 12 of a longitudinal side 11 intercepts the transverse axis 10 of the screw head at an acute angle β which may be between 60° and 85° and in the shown embodiment is approximately 70°.

FIGS. 4a and 4b show schematically in a plan view the position of a conventional clamping screw in the mounting rail for nominal dimensions (FIG. 4a), respectively, for oversize of the rail width (FIG. 4b). As a comparison, the position of the inventive clamping screw in FIGS. 5a and 5b is shown coinciding with the representation in FIGS. 3a and 3b. As can be seen in this comparison, it is important for the inventive clamping screw that the clamping portions 7 are not aligned with center portion 21 as in the embodiment according to FIG. 4, but are curved relative to the center portion 21. In the shown embodiment the lateral surfaces of the following portion 23 extend approximately in the direction of the diagonal d1, however, they could also be curved more strongly relative to the lateral surfaces of the center portion 21 so that they would substantially extend at an acute angle to the diagonal d2.

Figure 3B:
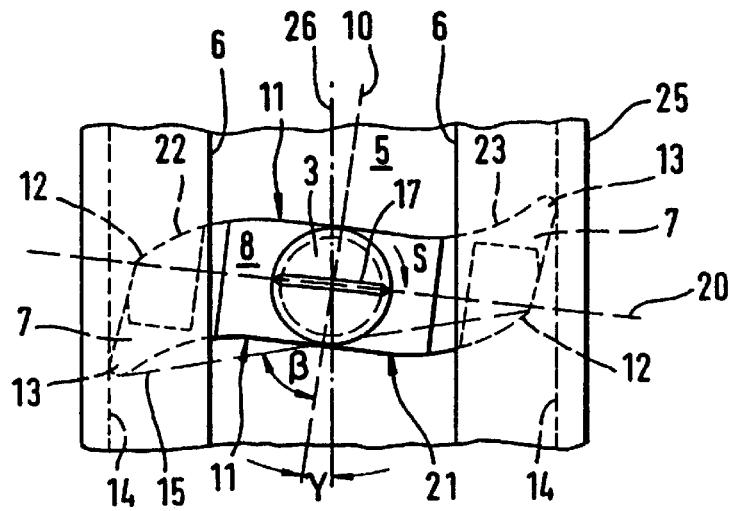
FIGS. 3a–3a each show in plan view the clamping in different positions within the mounting rail which depend on the dimensional tolerances.
Figure 3A:
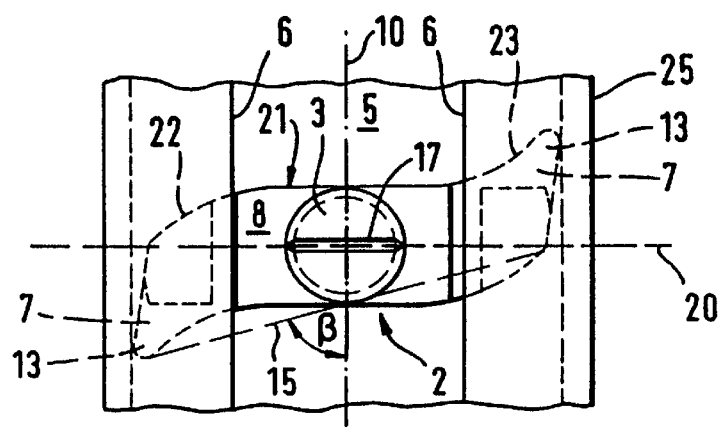
Figure 3C:
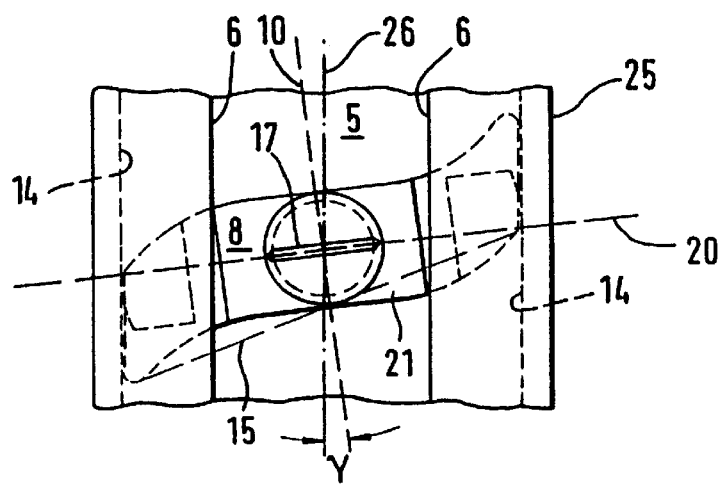

As shown in FIGS. 3a, 3b, and 3c, this configuration of the screw head 2 ensures that the center portion 21 and the marking notch 17, which is visible during mounting of the clamping screw in the slot 5 in the mounting rail 25, are positioned in the two positions (FIGS. 3b and 3c) only at a slight slant relative to the rail axis 26 so that a distinctive orientation aid for mounting is provided.

FIG. 3a shows the position in the situation in which the mounting rail and the head of the clamping screw have exact nominal dimensions. In the case according to FIG. 3b, the width of the slot 5 of the rail is greater. The thus resulting rotation angle y is very small. The blocking edges 13 rest at the groove walls 14 such that, even for an increased force expenditure, a further rotation of the clamping screw in the rotational direction S is prevented. As can be seen when comparing the respective FIGS. 5b and 4b, for conventional embodiments of the clamping screw such a further rotation would be easily possible.

In FIG. 3c the position of the screw head is shown in the case that the width of the rail slot 5 is undersized. In this case, the rotation angle y is also small. The position of the clamping screw is determined by the end faces of the clamping portions 7 resting substantially areally at the groove walls 14.

With the inventive embodiment of the clamping screw with clamping portions that are displaced relative to one another in the direction of the transverse axis 10, whereby the connecting line 15 between a leading edge 12 and a blocking edge 13 does not intercept the transverse at a right angle, a maximum diameter between the blocking edges 13 is ensured for a minimal cross-sectional area of the screw head. The width of the screw head corresponds approximately to the diameter of the thread-bearing screw shaft 3 so that the cross-sectional area of the screw head and thus the weight of the clamping screw is reduced to a minimum.

What is claimed is:

1. A clamping screw (1) comprising:
   a hammer-shaped screw head (2) having a longitudinal axis (20) and a transverse axis (10) extending at a right angle to said longitudinal axis (20);
   a threaded screw shaft (3) connected to said screw head (2) and having a screw axis (16) extending perpendicularly to said longitudinal axis (20) and said transverse axis (10);
   said screw head (2) adapted to be inserted in a positive-locking manner into a T groove (4) of a construction component (25), whereby in a mounting position said screw head (2) extends transverse to a longitudinal slot (5) of the T groove (4);
   said screw head (2) having longitudinal sides (11) extending in a longitudinal direction defined by said longitudinal axis (20), said longitudinal sides (11) having first lateral surfaces extending perpendicularly to said transverse axis (10);
   said screw head (2) having terminal clamping portions (7) in said longitudinal direction for engaging support legs (6) that extend on both sides of the longitudinal slot (5) of the construction component (25);
   said clamping portions (7) each having a leading edge (12) in a rotational tightening direction (S) of said clamping screw (1) and a following blocking edge (13) for engaging a groove wall (14) of the T groove (4);
   said blocking edge (13) projecting from a plane of said first lateral surfaces;
   wherein a connecting line (15) between said leading edge (12) and said blocking edge (13) of a same one of said longitudinal sides (11) intercepts said transverse axis (10) of said screw head (2) at an angle β that deviates from 90°.

2. A clamping screw according to claim 1, wherein said screw head (2) has radial symmetry relative to said screw axis (16).

3. A clamping screw according to claim 1, wherein said screw shaft (3) is provided with a rotational angle marking (17).

4. A clamping screw according to claim 1, wherein said rotational angle marking is a marking notch (17) in a free shaft end (18) of said screw shaft (3).

5. A clamping screw according to claim 1, wherein:
   said screw head (2) has a central portion (21) and said clamping portions (7) are connected to opposite ends of said central portion (21)
   said first lateral surfaces are provided at said central portion (21);
   said longitudinal sides (11) have second lateral surfaces at said clamping portions (7);
   said second lateral surfaces are positioned angularly relative to said first lateral surfaces, when viewed in a direction of said screw axis (16).

6. A clamping screw according to claim 5, wherein said second lateral surfaces extend approximately in a direction of a diagonal of said central portion (21).

7. A clamping screw according to claim 1, wherein said longitudinal sides (11) have a leading portion (22) convexly curved relative to said leading edge (12) and a following portion (23) concavely curved relative to said blocking edge (13).

8. A clamping screw according to claim 5, wherein said central portion (21) projects relative to said clamping portions (7) in a direction toward said screw shaft (3).

9. A clamping screw according to claim 1, wherein said longitudinal sides (11) are comprised of straight portions.

10. A clamping screw according to claims 1, wherein said clamping portions (7) have a respective clamping wedge (19) with a surface slanting downwardly in said longitudinal direction (20) toward said transverse axis (10).

11. A clamping screw according to claim 1, wherein at least some of said leading edges (12) and blocking edges (13) are rounded.

12. A clamping screw according to claim 1, wherein said blocking edges (13) are rounded.

13. A clamping screw according to claim 1, wherein said longitudinal axis (20) extends between said leading edge (12) and said blocking edge (13) of a same one of said clamping portions (7).

14. A clamping screw according to claim 1, wherein said angle β between said transverse axis (10) and said connecting line (15) is between 60° and 85°, especially 70°.

15. A clamping screw according to claim 1, wherein a width of said screw head (2) corresponds substantially to a nominal diameter of said screw shaft (3).

16. A clamping screw according to claim 1, wherein said screw head (2) has a socket (8) to which said screw shaft (3) is connected, wherein said socket (8) has alignment surfaces (9) extending parallel to a plane defined by said transverse axis (10) and said screw axis (16), whereby said socket (8) in the mounting position is positioned between the support legs (6) of the construction component (5).

* * * * *

UNITED STATES PATENT AND TRADEMARK OFFICE
CERTIFICATE OF CORRECTION

PATENT NO. : 6,086,300
DATED : July 11, 2000
INVENTOR(S) : Klaus Fröhlich

It is certified that error appears in the above-identified patent and that said Letters Patent is hereby corrected as shown below:

On the Title page, the following items (s) should read as follows:

[75] Inventor:
Klaus Fröhlich, Pforzheim, Germany

[73] Assignee:
Halfen GmbH & Co. Kommanditgesellschaft

Signed and Sealed this

Tenth Day of July, 2001

*Attest:*

*Nicholas P. Godici*

*Attesting Officer*

NICHOLAS P. GODICI
*Acting Director of the United States Patent and Trademark Office*